United States Patent
Schilling et al.

(10) Patent No.: US 11,975,993 B2
(45) Date of Patent: May 7, 2024

(54) OZONE OXIDATION PROCESS FOR TREATMENT OF WATER CONTAINING AZOLES AND AZOLE-TYPE COMPOUNDS

(71) Applicant: SUEZ Treatment Solutions Inc., Paris la Defense (FR)

(72) Inventors: Barbara Schilling, West Orange, NJ (US); Antonio Lau, Richmond, VA (US); Bruno Heiniger, Boll (CH)

(73) Assignee: Suez Treatment Solutions, Inc., Paris la Defense (FR)

( * ) Notice: Subject to any disclaimer, the term of this patent is extended or adjusted under 35 U.S.C. 154(b) by 257 days.

(21) Appl. No.: 16/879,527

(22) Filed: May 20, 2020

(65) Prior Publication Data

US 2021/0017055 A1    Jan. 21, 2021

Related U.S. Application Data

(63) Continuation of application No. 14/731,626, filed on Jun. 5, 2015, now abandoned.
(Continued)

(51) Int. Cl.
*C02F 1/78* (2023.01)
*C02F 1/72* (2023.01)
(Continued)

(52) U.S. Cl.
CPC .............. *C02F 1/78* (2013.01); *C02F 1/725* (2013.01); *C02F 2101/38* (2013.01); *C02F 2103/346* (2013.01); *C02F 2201/002* (2013.01)

(58) Field of Classification Search
CPC .... C02F 1/78; C02F 1/725; C02F 1/72; C02F 1/4672; C02F 2101/38; C02F 2101/30;
(Continued)

(56) References Cited

U.S. PATENT DOCUMENTS

| 3,685,656 | A | * | 8/1972 | Schaefer | C02F 1/78 |
| | | | | | 210/195.1 |
| 4,289,594 | A | * | 9/1981 | Alpaugh | C02F 9/00 |
| | | | | | 588/407 |
| 2012/0006755 | A1 | * | 1/2012 | Yasuike | C02F 1/5245 |
| | | | | | 210/721 |

FOREIGN PATENT DOCUMENTS

EP    1502963 A1 *  2/2005 ............... C02F 9/00

* cited by examiner

*Primary Examiner* — Claire A Norris
(74) *Attorney, Agent, or Firm* — Landmark Intellectual Property Law, LLC; Gregory M Murphy

(57) ABSTRACT

The present invention is generally directed to the use of an ozone oxidation process to remove azoles and azole-type compounds from wastewater. Specifically, the present invention is directed to a chemical treatment system for wastewater, including: an oxidation module receiving wastewater input and outputting an effluent; wherein the oxidation module removes azole-type compounds from the wastewater; and wherein the effluent has a reduction in azole-type compounds greater than ninety percent (90%). In accordance with some embodiments, the present invention provides an oxidation module receiving as inputs: wastewater received from a chemical mechanical polishing process and ozone gas received from an ozone generator; the oxidation module outputting an effluent; wherein the oxidation module removes azole-type compounds from the input wastewater; wherein the effluent has a reduction in azole-type compounds greater than ninety percent (90%); and wherein the oxidation module does not require ferrous treatment or solid-liquid separation before treatment.

7 Claims, 4 Drawing Sheets

Related U.S. Application Data

(60) Provisional application No. 62/008,141, filed on Jun. 5, 2014.

(51) Int. Cl.
*C02F 101/38* (2006.01)
*C02F 103/34* (2006.01)

(58) Field of Classification Search
CPC .............. C02F 2101/40; C02F 2101/34; C02F 2101/10; C02F 2103/346; C02F 2209/06; C02F 2201/002; C02F 2201/78; C02F 2201/782; C02F 2305/02; C02F 2305/023; Y10S 210/908
USPC ........ 210/205, 721, 702, 749, 758, 760, 908
See application file for complete search history.

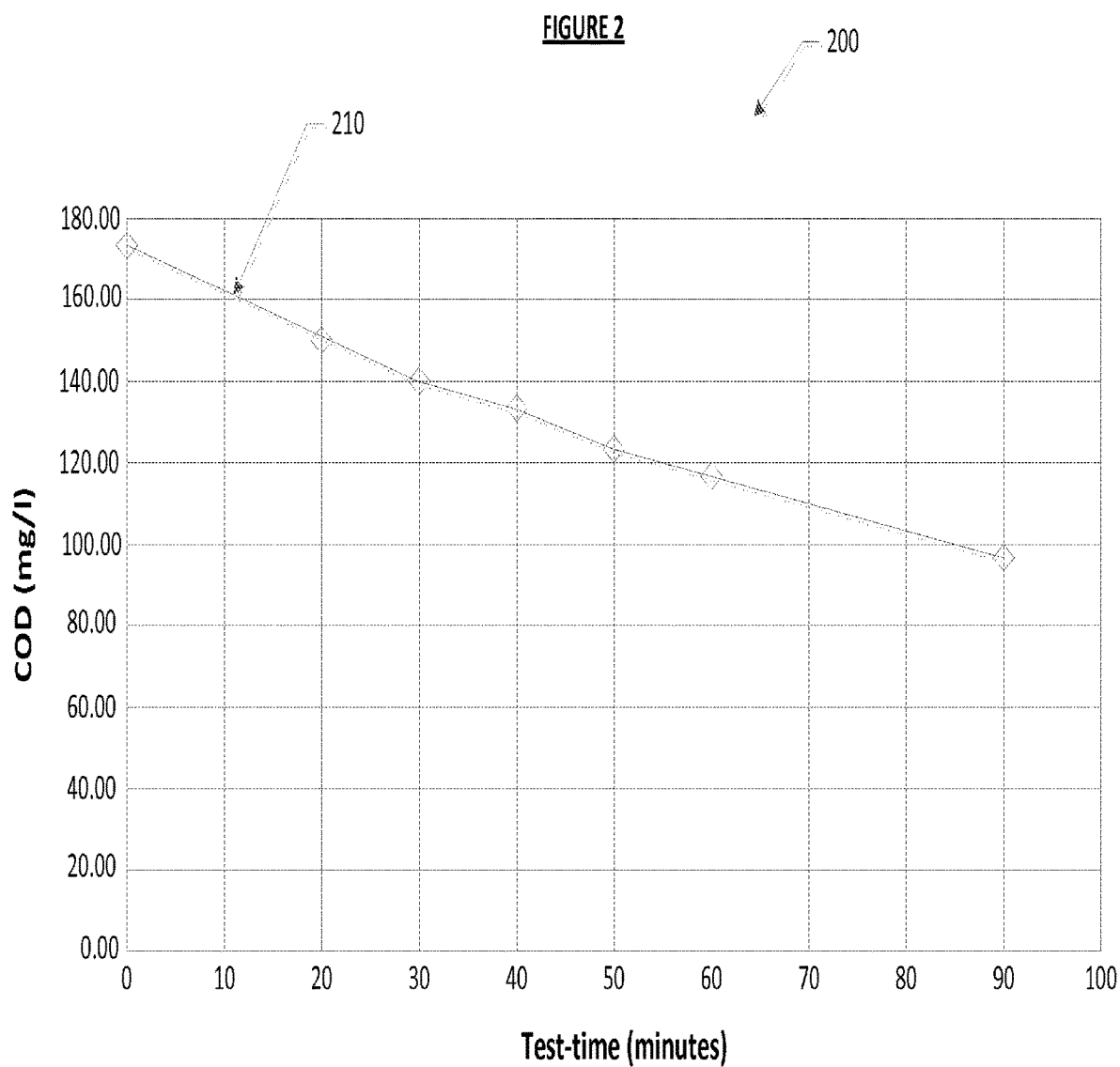

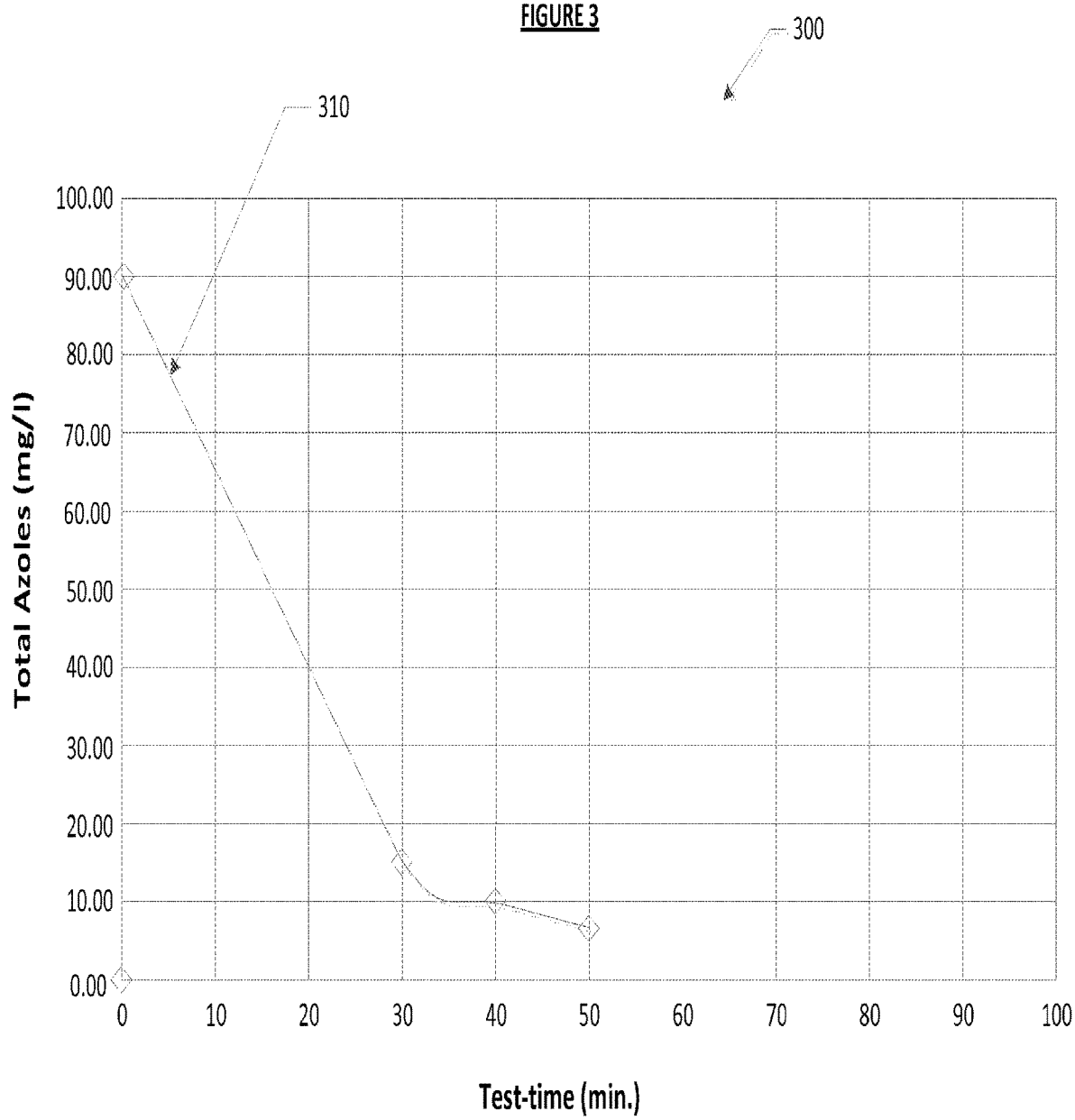

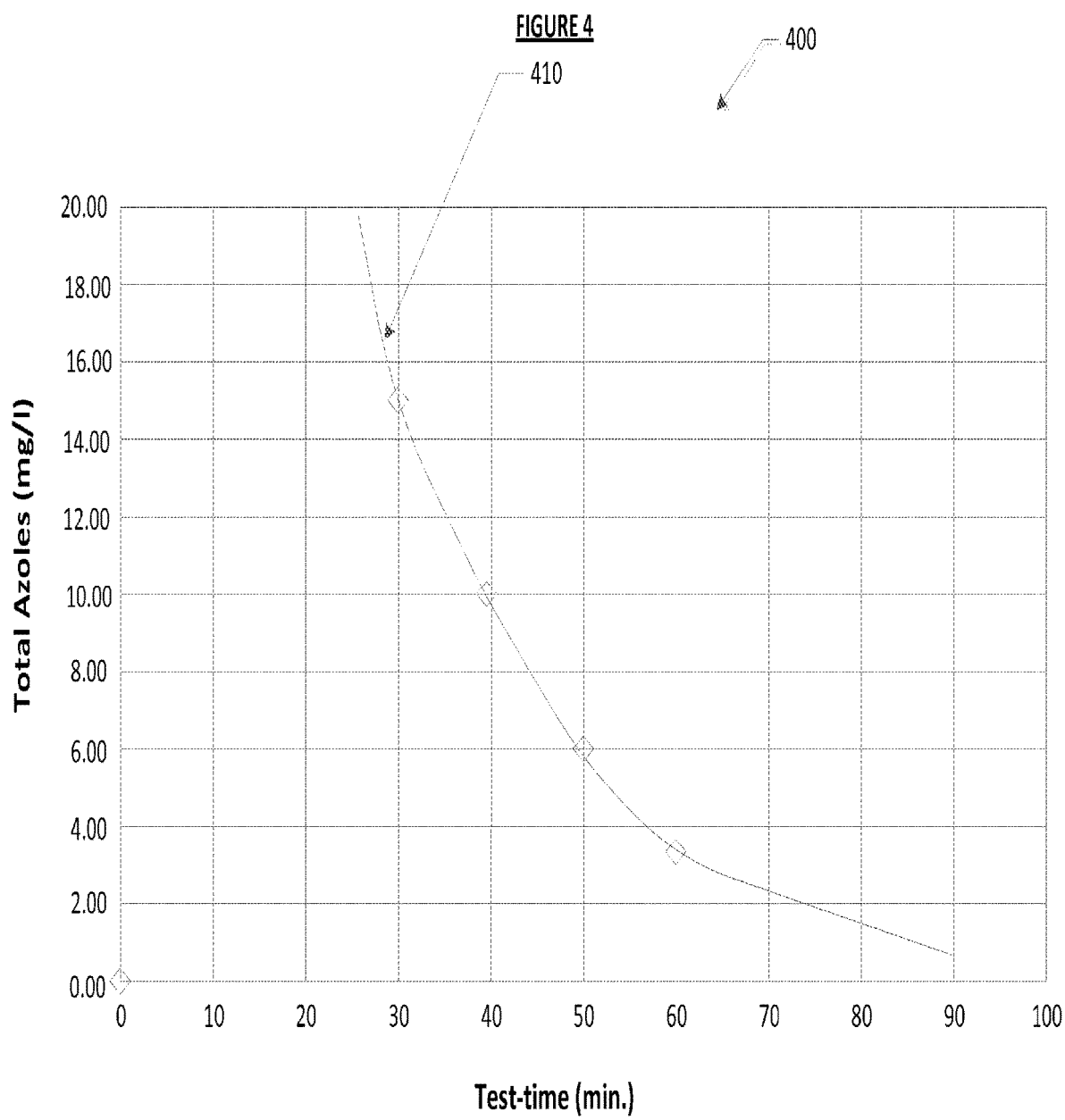

OZONE OXIDATION PROCESS FOR TREATMENT OF WATER CONTAINING AZOLES AND AZOLE-TYPE COMPOUNDS

BACKGROUND

In general, the present invention is directed to systems and methods of treating wastewater produced by manufacturing processes used to produce electronic components and semiconductor devices. More specifically, the present invention is directed to systems and methods for removing various compounds, such as, but not limited to, the family of azoles and azole-type compounds, which may include: benzotriazole, pyrazole, 4-methyl-1-H-benzotrazole, 5-methyl-1-H-benzotrazole, imidazole, 1,2,4 1H-triazole, 3-amino triazole, tetrazole, oxazole, thiazole, diazoir 1,2,3, thiadiazole, and other azole derivatives that may include compounds comprising a fused azole and benzene ring. Such compound may be removed from wastewater and 'drag out' water generated by, for example, plating acid waste in a chemical mechanical polishing (CMP) step that may be used in a fabrication process of semiconductor devices, and/or from a manufacture of opto-electronic components, such as thin-film transistor liquid crystal displays (TFT-LCDs).

As manufacturing processes in the opto-electronic and semiconductor industries advance, the composition of wastewater generated by such processes has become more complex. For example, such wastewater may be comprised of both organic carbon compounds and organic nitrogenous compounds, which may be poisonous, corrosive, and eutrophic to the environment.

Thin film transistor liquid crystal displays are a type of LCD that uses thin-film transistor technology to provide an active matrix LCD. TFT-LCDs are used in a variety of consumer products, such as television sets, computer monitors, mobile telephones, navigation systems, etc.

The production of TFT-LCDs in particular, may generate significant amounts of high-strength organic nitrogen containing wastewater. Such wastewater may comprise various contaminants, such as azole compounds, tetramethylammonium hydroxide (TMAH), monoethanolamine ($C_2H_5ONH_2$, MEA), and dimethyl sulphoxide (($CH_3$)$_2SO$, DMSO). Azole compounds and TMAH may be used as a developer in the production of TFT-LCDs, while MEA and DMSO may be used as strippers in TFT-LCD production, as well as chelating agents. TMAH may also be used as a component of a positive photoresist developers in a photolithography process of TFT-LCD manufacturing. Triazoles, TMAH, MEA, and DMSO are generally seen as slow biodegradable organic compounds, which during degradation typically release ammonia, resulting in a high ammonia concentration and a potential nitrification in treated wastewater.

Historically, semiconductor and electronic component manufacturing plants discharged their wastewater to local publicly owned treatment works (POTW) systems. However, the increased loading due to the recent growth of the semiconductor industries coupled with more stringent discharge regulations imposed on POTW to remove organic and nitrogen compounds from wastewater may limit the ability of any such POTW to adequately treat such discharge.

Various microorganisms are capable of degrading DMSO under certain conditions. For example, *Escherichi coli, Klebsiella, Serratia, Citrobacter braakii, Cyptococcus humicolus, Hyphomicrobium* species, and Rhodobacter capsulatus have shown positive results in degrading DMSO. Moreover, MEA can often be degraded through a wide variety of reactions common to amine and alcohol, and can be hydrated to ammonia and acetate. However, degradation of azole and azole-related compounds and TMAH has been particularly problematic, in that the presence of the wide variety of triazole and azole-compounds, either accompanied by TMAH or alone, has an adverse and inhibitory impact on nitrification activity. Specifically, it has been shown that triazoles can inhibit nitrification at levels greater than 1 mg per liter.

Accordingly, systems and methods for treating wastewater resulting from the production of TFT-LCDs that effectively remove triazoles as well as COD and total nitrogen are desired.

SUMMARY OF THE INVENTION

Aspects in accordance with some embodiments of the present invention may include a chemical treatment system for wastewater, comprising: an oxidation module receiving as an input wastewater and outputting an effluent; wherein the oxidation module removes azole-type compounds from the input wastewater; and wherein the effluent has a reduction in azole-type compounds greater than ninety percent (90%).

Aspects in accordance with some embodiments of the present invention may include a chemical treatment system for wastewater, comprising: an oxidation module receiving as inputs: wastewater received from a chemical mechanical polishing process; and ozone gas received from an ozone generator; the oxidation module outputting an effluent; wherein the oxidation module removes azole-type compounds from the input wastewater; wherein the effluent has a reduction in azole-type compounds greater than ninety percent (90%); and wherein the oxidation module does not require ferrous treatment or solid-liquid separation before treatment.

Other aspects in accordance with some embodiments of the present invention may comprise a chemical treatment system for wastewater comprising an oxidation module applying ozone gas to the wastewater to reduce azole-type components, wherein the azole-type compounds comprise azole compounds and their derivatives including benzotriazole, pyrazole, 4-methyl-1-H-benzotrazole, 5-methyl-1-H-benzotrazole, imidazole, 1,2,4 1H-triazole, 3-amino triazole, tetrazole, oxazole, thiazole, diazole, 1,2,3-thiadiazole.

Other aspects in accordance with some embodiments of the present invention may comprise a chemical treatment system for wastewater comprising an oxidation module applying ozone gas to the wastewater to reduce azole-type components, wherein the oxidation module is the sole treatment for the reduction of azole-type compounds.

Other aspects in accordance with some embodiments of the present invention may comprise a chemical treatment system for wastewater comprising an oxidation module applying ozone gas to the wastewater to reduce azole-type components, wherein the oxidation module removes organic materials having a chemical oxygen demand (COD).

Other aspects in accordance with some embodiments of the present invention may comprise a chemical treatment system for wastewater comprising an oxidation module applying ozone gas to the wastewater to reduce azole-type components, wherein the wastewater treated by the oxidation module comprises hydrogen peroxide ($H_2O_2$).

Note that systems and methods in accordance with some embodiments of the present invention explicitly do not require any ferrous treatment and/or solid-liquid separation as a pretreatment to the ozone oxidation process. Additionally, systems and methods in accordance with some embodiments of the present invention may not require any pH adjustment. Moreover, systems and methods in accordance with some embodiments of the present invention may be used in water that includes hydrogen peroxide (H2O2) in the wastewater.

DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which:

FIG. 2 illustrates an exemplary COD removal performance over time, in accordance with some embodiments of the present invention.

FIG. 3 illustrates an exemplary total azole and azole-related compound removal over time, in accordance with some embodiments of the present invention.

FIG. 4 illustrates an exemplary total azole removal over time, in accordance with some embodiments of the present invention.

Figure 1:
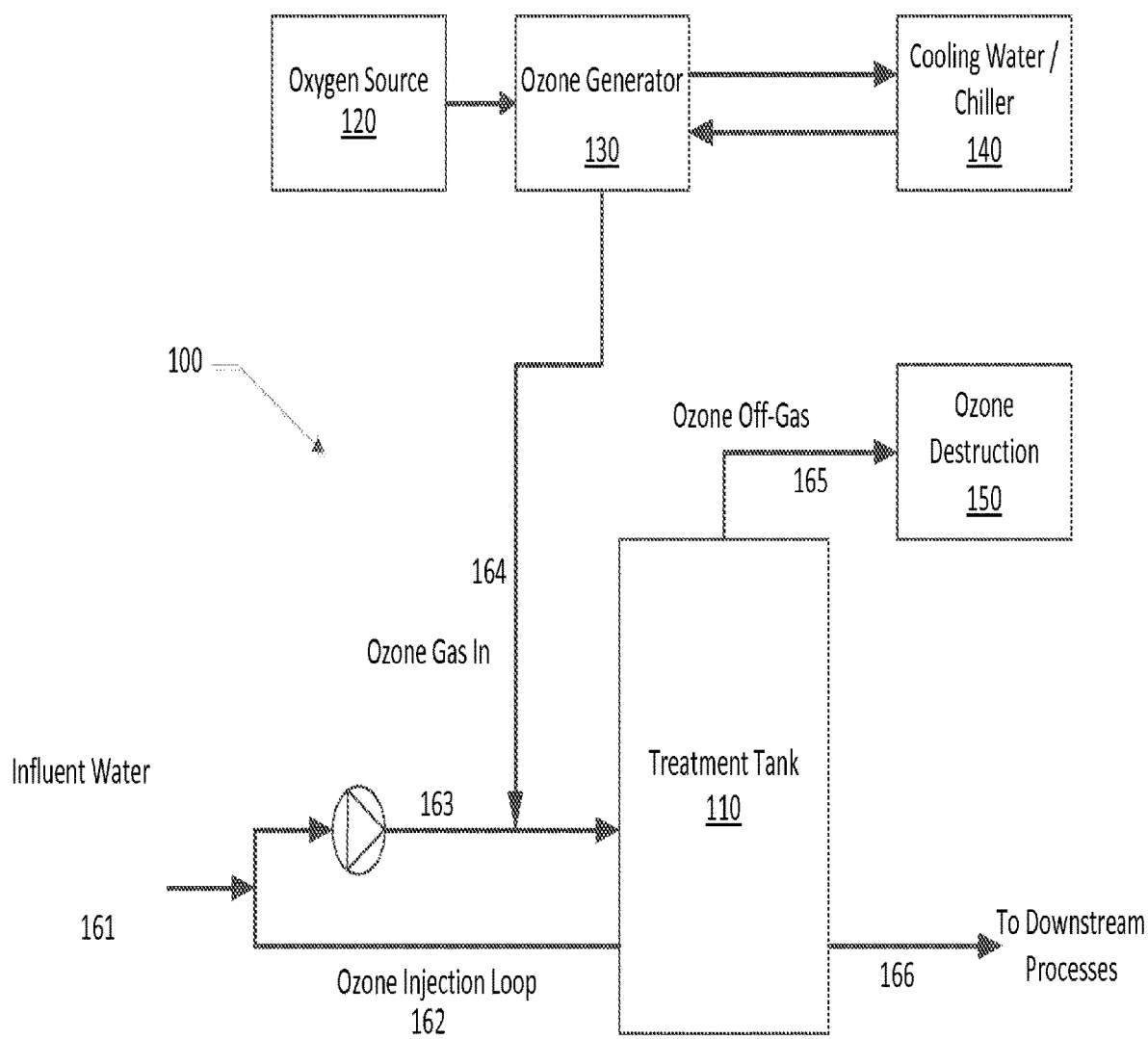
FIG. 1 illustrates a flow diagram showing an embodiment of a process for treatment of water containing azole-type compounds according to the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

In general, the present invention teaches a chemical treatment system for treating wastewater comprising liquid and solid components, comprising an oxidation module. The oxidation module may receive wastewater that is an output of a production process and output from the oxidation module an effluent. Azole-type compounds may be removed from such wastewater containing these compounds, such as, water from a chemical mechanical polishing (CMP) step in the semiconductor fabrication process. Specifically, the present invention may address the oxidation of azole compounds which may remain in the water that is 'dragged out' during the semiconductor fabrication process.

Moreover, in addition to removal of azole-type compounds, the oxidation module may remove organic azole-related compound and other organic compounds—namely those compounds that are known to have a chemical oxygen demand (COD). Similarly, the oxidation module may remove organic materials having a carbon content—those compounds having a total organic carbon content (TOC). Furthermore, the oxidation module may remove organic materials—including azole-related compounds—from wastewater that contains hydrogen peroxide (H2O2).

Note that systems and methods in accordance with some embodiments of the present invention explicitly do not require any ferrous treatment and/or solid-liquid separation as a pretreatment to the ozone oxidation process. Additionally, systems and methods in accordance with some embodiments of the present invention may not require any pH adjustment, and may be used in water that includes hydrogen peroxide (H2O2) in the wastewater.

In order to determine the efficacy of the systems and methods discussed herein, a plating acid wastewater from a semiconductor fabrication process was tested. In the present invention, the plating acid wastewater containing any number of azole compounds may be used. The azole compound is an aromatic ring containing at least one nitrogen heteroatom. These compounds may include, but are not limited to, the azole compounds and their derivatives commonly used in the plating and CMP steps, such as, benzotriazole, pyrazole, 4-methyl-1-H-benzotrazole, 5-methyl-1-H-benzotrazole, imidazole, 1,2,4 1H-triazole, 3-amino triazole, tetrazole, oxazole, thiazole, diazole, 1,2,3-thiadiazole. Azole derivatives include compounds which comprise a fused azole and benzene ring.

The water containing the azole compounds and derivatives may contain one or more of these compounds. The plating acid wastewater was collected from a semiconductor manufacturer located in the United States and treated with ozone at a specific ozone dose and retention time and with various pH levels to remove azole compounds to the desired level for effluent discharge to a publicly owned treatment facility.

The primary purpose of the test work was to remove azole compounds to less than 2 mg/liter. Table 1 sets forth exemplary results.

TABLE 1

Overall Influent and Effluent Characteristics of Ozone Treatment

|  | Influent | Ozone-treated Effluent | Removal |
| --- | --- | --- | --- |
| TOC (mg/L) | 95 ± 5 | 75 ± 3 | >20% |
| NH4—N (m/L) | 7 ± 1 | 6 ± 3 | — |
| NO3—N (mg/L) | <1.0 | >3.4 | — |
| COD (mg/L) | 168 ± 20 | 94 ± 4 | >40% |
| Total Azoles (mg/L) | 90 ± 6 | <1.5 | >97% |

In order to understand the application and results of the systems and methods embodied in the present invention, it may first be useful to understand the characteristics of the wastewater to be treated by such systems and methods.

Table 2 shows the characteristics of the wastewater collected from the semiconductor manufacturer located in the United States.

TABLE 2

Typical Wastewater Quality from Fabrication Site

| Parameters | Units | Site 1 |
|---|---|---|
| Triazoles | ppd | 274 |
| Total COD | ppd | 1,872 |
| Total Nitrogen | ppd | 241 |
| Hydrogen Peroxide | mg/L | <20 |
| Total Suspended Solids | mg/L | 1,908 |
| Total Dissolved Solids | mg/L | 268 |
| Copper | mg/L | <0.5 |
| pH | | 3 |

In the present invention, ozone is injected into the wastewater for the purpose of removing azole compounds to a level less than 2 mg/liter (2 ppm) and, further, for removal of COD and TOC to the levels required after azole removal.

Note some potential variations that may be present in systems and methods in accordance with some embodiments of the present invention without deviating from the invention: the amount of ozone to be injected may not be fixed to a set dose and will vary based on water quality; the pH of the water to be treated may be less than 8 during the process; the pH of the water may vary; a solid catalyst, ferrous ions, or carbon, may not be required; solid-liquid separation may not be required; and/or hydrogen peroxide may not be added, but may be present in the wastewater.

Full-Scale Treatment System

Utilizing the systems and methods of the present invention, parameters for a full-scale treatment system can be set forth. Note that the following parameters are exemplary only, and variations in the sizes, rates, coefficients, and efficiencies may vary while still being taught by the present invention.

A full scale ozone system may have characteristics, such as, an influent total azole concentration of 140 mg/liter, an effluent of less than 2 mg/liter, and with a variable flow rate. Ozone amounts may vary, depending on background COD interference, and may have various ozone to azole ratios. Ozone to azole ratios may be 2:1 to 500:1. Current testing has routinely measured such ratios at ranges of 5:1 to 80:1 or greater.

In addition, the ozone treatment system may comprise an oxidation tank, which may allow for recirculation for a set period of time. For example, recirculation may occur for more than 180 minutes. In addition, the ozone system may comprise a system of analyzers and instruments to provide a determination as to when the oxidation is complete.

With reference to FIG. 1 an exemplary system 100 for using a single oxidation module as treatment for wastewater is shown. System 100 generally comprises a treatment tank 110, an oxygen source 120, an ozone generator 130, a cooling water/chiller unit 140, an ozone destruction unit 150, and various liquid communication pipes 161-166.

In operation, influent water or wastewater may be supplied to the system 100 through conduit 161. Influent water may be split to directly enter the treatment tank 110 via conduit 162, or may enter conduit 163 and receive ozone gases. Note that the fluid flow in conduit 163 may be created or assisted by a pump, as shown. Influent water that has received ozone gas may then enter the treatment tank 110.

Ozone may be created by oxygen generated or received by oxygen source 120 being provided to ozone generator 130. Due to the production of heat in the process, ozone generator 130 may be cooled, for example through the use of cooling water received from a chiller 140.

Once the ozone gas is generated by the ozone generator 130, the ozone gas may be supplied to the influent water via conduit 164. Water with ozone gas may then enter the treatment tank 110. During treatment, ozone off-gas may be captured and may exit the treatment tank 110 via conduit 165. Ozone off gas may be provided to an ozone destruction unit 150, which may break down the ozone. Ozone destruction unit 150 may, in accordance with some embodiments, comprise a vertical ozone destruction unit.

Treated water may exit the system via conduit 166. Such treated water may be provided to additional downstream processes, or may, in some circumstances, be discharged to a POTW.

Testing has shown the efficacy of the present invention. Using an oxidation module as a single treatment on wastewater with characteristics as set forth above in Table 2, significant reduction in COD, TOC, and Azoles has been achieved. Such exemplary results are set forth in FIGS. 2-5.

With reference to FIG. 2, an exemplary graph 200 showing the relationship of COD to test-time is illustrated. It can be seen from the graph that during the duration of the test, the measurable COD (in mg/liter) is reduced from approximately 170.00 mg/l to approximately 90.00 mg/l over a period of 90 minutes. The trend line of the reduction of COD over time is illustrated at 210.

FIGS. 3 and 4 illustrate test results that compare the total azoles (mg/l) in treated water as compared to test time.

With reference to FIG. 3 and graph 300, azole values of 90.00 mg/l existed at the start of treatment. Thirty (30) minutes into treatment—applying the processes discussed above—azoles dropped to approximately 15.00 mg/l. This reduction slowed down somewhat, with azole amounts of 10.00 mg/l at forty (40) minutes, and approximately 5.00 mg/l at fifty (50) minutes. Trend line 310 indicates the reduction of azoles during the testing.

With reference to FIG. 4 and graph 400, it can be seen that at the treated water had total azoles of approximately 15.00 (mg/l) at thirty (30) minutes into treatment. This amount dropped to 10.00 (mg/l) of azoles at forty (40) minutes, to 6.00 (mg/l) at fifty (50) minutes, to approximately 3.00 (mg/l) at sixty (60) minutes. Trend line 410 indicates the relationship.

Accordingly, it can be seen that systems and methods of reducing azoles and azole type compounds can be achieved using a single oxidation treatment vessel. The process does not require the addition of any other materials (such as, but not limited to, ferrous ions or other ferrous treatment). Similarly, the systems and methods in accordance with some embodiments of the present invention explicitly do not require any solid-liquid separation as a pretreatment to the ozone oxidation process. Additionally, systems and methods in accordance with some embodiments of the present invention may not require any pH adjustment. Moreover, systems and methods in accordance with some embodiments of the present invention may be used in water that includes hydrogen peroxide ($H_2O_2$) in the wastewater.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense.

What is claimed is:

1. A method of reducing both azole-type compounds and chemical oxygen demand (COD) in wastewater resulting from a chemical-mechanical polishing process, the method being a chemical treatment using advanced oxidation and utilizing ozone, comprising:
receiving as an input via an influent conduit influent wastewater into an oxidation module comprising a treatment tank;
supplying ozone to the influent wastewater via an ozone conduit before being fed into the tank; and
outputting the treated water as an effluent from the oxidation module via an effluent conduit;
characterised in that the oxidation module is the sole treatment for reduction of azole-type compounds and COD reduction, and none of ferrous treatment, solid-liquid separation, or pH adjustment pre-treatment processes are used, the wastewater treated for less than ninety (90) minutes and treatment resulting in an effluent having a reduction in azole-type compounds greater than 90% and a COD reduction greater than thirty percent (30%).

2. A method according to claim 1, wherein the ozone to azole ratio is 5:1 to 80:1.

3. A method according to claim 1, wherein the wastewater is received from semiconductor fabrication processes.

4. A method according to claim 1, wherein the azole-type compounds comprise azole compounds and their derivatives including benzotriazole, pyrazole, 4-methyl-1-H-benzotrazole, 5-methyl-1-H-benzotrazole, imidazole, 1,2,4 IH-triazole, 3-amino triazole, tetrazole, oxazole, thiazole, diazole, 1,2,3-thiadiazole.

5. A method according to claim 1, wherein the effluent has a reduction in azole-type compounds greater than ninety five percent (95%).

6. A method according to claim 1, wherein the oxidation module removes organic materials having a chemical oxygen demand (COD) by greater than forty percent (40%).

7. A method according to claim 1 wherein the wastewater treated by the oxidation module has a pH ranging from 2 to 8.

* * * * *